March 23, 1971 G. R. ONUFER 3,572,414
LOCKING FASTENER
Filed April 7, 1969
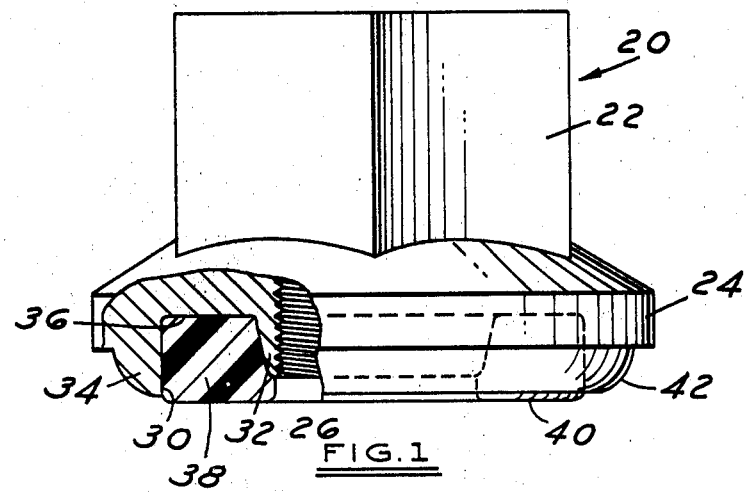
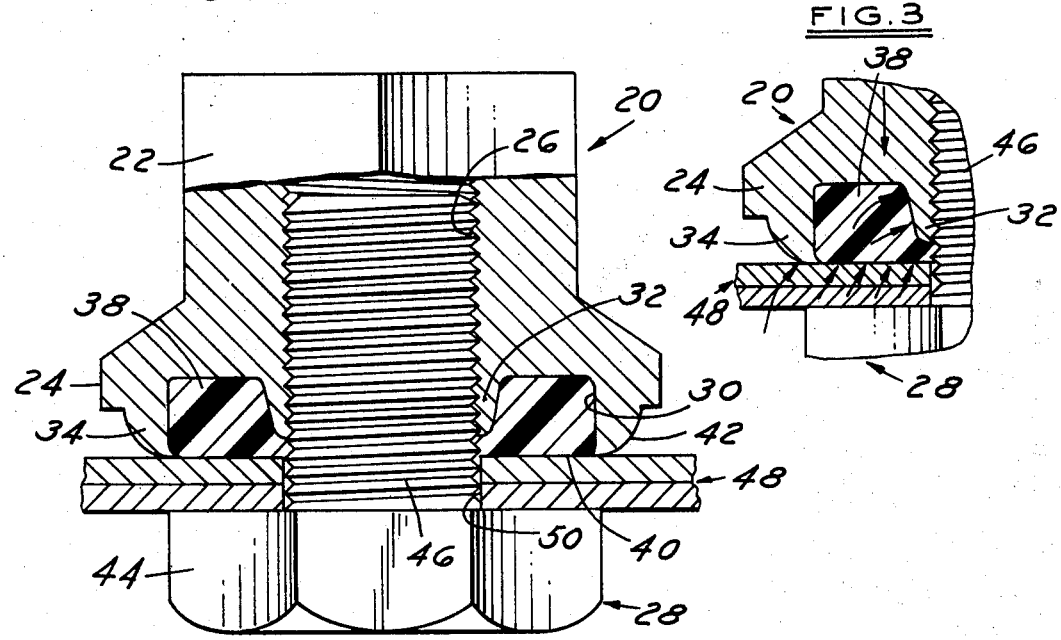
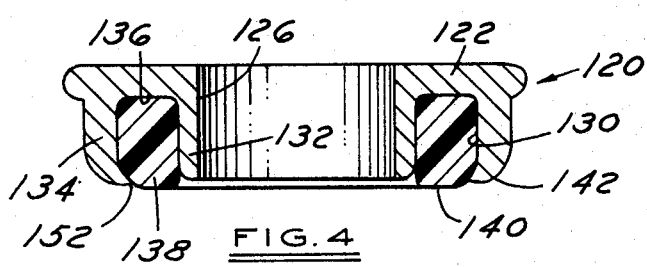
INVENTOR
GEORGE R. ONUFER
BY
Burton & Parker
ATTORNEYS United States Patent Office 3,572,414
Patented Mar. 23, 1971

3,572,414
LOCKING FASTENER
George R. Onufer, Bloomfield Hills, Mich., assignor to Russell, Burdsall & Ward Bolt and Nut Co., Port Chester, N.Y.
Filed Apr. 7, 1969, Ser. No. 813,971
Int. Cl. F16b 39/284
U.S. Cl. 151—19                                           3 Claims

ABSTRACT OF THE DISCLOSURE

A locking fastener such as a nut or washer having an aperture receiving a male threaded fastener, such as a bolt or screw, an annular chamber encircling the aperture, and a deformable, substantially incompressible annular insert received within the chamber, biasing the inner wall of the chamber into locking engagement with the male threaded fastener.

SUMMARY OF THE INVENTION

The locking fastener of this invention is particularly adapted to be received on a male threaded fastener to secure a structural member or element. The locking fastener of this invention seals the aperture receiving the male threaded fastener and locks the fastener in position. The body portion of the locking fastener includes an aperture adapted to receive a male threaded fastener, an annular chamber encircling the aperture, and an annular insert received in the chamber.

The annular chamber includes a deformable radial inner wall which is common to the aperture, a radial outer wall and an opening adjacent the open end of the aperture. The annular insert is received within the chamber, through the opening, and substantially fills the chamber. The annular insert in the preferred embodiment of the invention is formed of a resilient, substantially incompressible material, and is pressed into the chamber when the locking fastener is received on the male fastener and urged against the structural member. The pressure of the insert deforms the radial inner wall of the chamber inwardly, locking the fastener on the male fastener. The annular insert in the disclosed embodiment projects axially beyond the opening of the chamber to sealingly engage the structural member and press the insert within the chamber.

The annular insert may be formed from various materials depending upon the particular application, however in the preferred embodiment the insert may also lock the fastener against the surface of the structural member receiving the fastener. In this embodiment, the insert is formed of a low durometer plastic material having a high coefficient of friction in the dry state and a low coefficient of friction in the wet state, such as urethane rubber. The fastener may thus be easily assembled when the insert is wet, however the insert will lock or bind against the structural member when dry.

In the preferred embodiment of the locking fastener, the radial outer wall projects axially beyond the radial inner wall, and is adapted to be deformed radially inwardly to confine and press the annular insert within the annular chamber. In the disclosed embodiment, the axial end of the radial outer wall tapers toward the axis of the chamber, and is generally arcuate, such that the wall is deformed radially inwardly upon engagement with the structural member receiving the fastener assembly. The distal end of the radial outer wall may also be hooked inwardly to confine the insert during assembly, and direct the deformation.

The deformation of the walls defining the chamber is preferably resilient to prevent permanent deformation and permit reuse of the locking fastener. In the disclosed embodiment, the radial inner wall is generally conical, having a reduced thickness adjacent the opening to the chamber, permitting resilient deformation of the inner wall into locking engagement with the male fastener. It should be understood that a relatively small amount of deformation is required to provide the preferred locking action, and therefore the fastener may be reused.

BRIEF DESCRIPTION OF THE DRAWING

FIG. 1 is a partially cross sectioned side elevation of one embodiment of the locking fastener of this invention;

FIG. 2 is a partially cross sectioned side elevation of a fastener assembly utilizing the locking fastener shown in FIG. 1;

FIG. 3 is a partially cross sectioned side elevation of the assembly shown in FIG. 2, showing the locking action of the fastener of this invention; and FIG. 4 is a side cross sectional view of another embodiment of the locking fastener of this invention.

DESCRIPTION OF THE PREFERRED EMBODIMENTS

The embodiment of the locking fastener or nut member 20 shown in FIG. 1 includes a conventional hexagonal body portion 22, a flange or skirt portion 24 and a threaded aperture 26 adapted to receive a male threaded fastener 28, as shown in FIG. 2. It will be understood that the invention disclosed herein is also applicable to other standard nuts or special nuts, and is not limited to the flange nut shown. The flange nut may however be preferred because the flange portion 24 provides accommodation for the annular chamber 30.

The annular chamber is co-axially aligned with the threaded aperture 26, and encircles the aperture such that the radial inner wall 32 is common to the aperture. That is, the radial inner wall 32 of the chamber is also the outer wall of the aperture 26. The chamber is defined by the radial inner wall 32, a radial outer wall 34 and a rearward wall 36. The opposite end of the chamber is open, as shown, to receive the annular insert 38.

The annular insert 38 is preferably formed of a deformable, substantially incompressible material, and in this embodiment the axial end 40 protrudes beyond the opening to the chamber 30. The radial inner wall 32 of the chamber is deformable to lock the fastener on the male threaded fastener, as described hereinbelow, and in this embodiment the wall is generally conical to permit deflection without permanent deformation. The axial end 42 of the radial outer wall is preferably tapered toward the axis of the chamber, and extends beyond the end of the radial inner wall, such that the radial outer wall will be deformed radially inwardly to confine and press the insert 38 into the chamber. In this embodiment, the end of the radial outer wall is arcuate in cross section to permit smooth resilient deformation of the wall.

The fastener assembly shown in FIG. 2 includes the nut member 20 described hereinabove a conventional male fastener or bolt 28 having a head portion 44 and a threaded shank portion 46 threadably received in the female threaded aperture 26 of the nut member, and a panel assembly or other structural member 48 secured by the fastener assembly. The nut m ember is threaded onto the bolt 28, through the apertures 50 in the panel assembly in the conventional manner. The axially projecting portion 40 of the annular insert 38 first engages the panel assembly 48, and is then pressed into the annular chamber 30, as shown in FIGS. 2 and 3. The axial end 42 of the radial outer wall 34 next engages the panel assembly, and is resiliently deformed radially inwardly, confining the annular insert and further pressing the insert within the chamber 30. The outer wall also prevents entry of foreign matter into the fastener assembly including the annular insert.

The insert is preferably formed of a deformable, substantially incompressible material as stated hereinabove, and therefore the compressive forces are transmitted through the insert as shown in FIG. 3. The radial outer wall 34 confines the insert within the chamber, preventing lateral deformation or outward extrusion, and directs the compressive force against the deformable radial inner wall 32 of the chamber. The inner wall is thus resiliently deformed radially inwardly into locking engagement with the threaded shank portion 46 of the male threaded fastener, and the projecting end 40 of the insert seals the apertures 50 through the panel assembly. It will be noted from FIGS. 2 and 3 that the deformation required to lock the nut member on the bolt is relatively slight, and is within the elastic limit of conventional materials.

The annular insert 38 may be formed from various materials depending on the particular application, including various plastic compositions, or sintered metal compositions in certain high temperature applications. In the preferred embodiment, however, the annular insert is formed of a material which binds or locks against the structural member receiving the fastener assembly, preventing rotation of the fastener assembly and aiding the locking action. For example, certain materials including certain low durometer plastics have a relatively low coefficient of friction in the wet state and a relatively high co-efficient or friction in the dry state. I have discovered that certain urethane rubber materials, including "Adiprene" manufactured by E. I. du Pont de Nemours & Co., Inc. have this characteristic. The utilization of a relatively low durometer urethane rubber for the annular insert therefore has a distinct advantage. The insert is wetted, with water for example, prior to assembly. The insert then easily slips over the surface of the structural member receiving the fastener assembly, such as the panel assembly 48 shown in FIGS. 2 and 3, because of the relatively low coefficient of friction. The surface 40 of the insert will of course dry after assembly, substantially increasing the coefficient of friction and locking the fastener assembly. Further, the compression of the insert against the panel assembly and the confining radial outer wall 34 will prevent entry of foreign material including moisture.

The lock washer member 120 shown in FIG. 4 functions similar to the nut member 20 described hereinabove, and has been numbered accordingly. This embodiment of the lock washer includes a body portion 122 having an aperture 126 adapted to receive a conventional male threaded fastener and an annular chamber 130 encircling the aperture 126 and receiving the annular insert 138. The chamber is defined by a deformable radial inner wall 132, common to the aperture 126, a radial outer wall 134 and a rearward wall 136. The insert 138 is preferably formed from a deformable, substantially incompressible material as described hereinabove, and includes a portion 140 projecting axially beyond the opening to the chamber. The radial outer wall includes an arcuate axial end portion 142 adapted to be deformed radially inwardly upon engagement with the structural member, and in this embodiment the distal end 152 is hooked radially inwardly to retain the insert within the chamber prior to assembly. The locking and sealing action of the washer member may be identical to the nut member described hereinabove, wherein the axial end 140 of the annular insert first engages the structural member receiving the fastener assembly, pressing the insert within the chamber 130. The arcuate axial end 142 of the radial outer wall next engages the structural member, confining the insert within the chamber and directing the compressive force of the insert against the radial inner wall 142, locking the washer member against the male threaded fastener. The insert 138 may be formed from a low durometer urethane rubber composition, as described hereinabove, or other suitable materials. The internal surface of the washer member may also be threaded to provide a nut member as described hereinabove.

What is claimed is:

1. A locking fastener, comprising: a body portion having an aperture opening through an end thereof adapted to receive a threaded male fastener, an annular chamber encircling said aperture at said end of the body portion and including a deformable radial inner wall common to said aperture, said chamber having a radial outer wall extending axially beyond the radial inner wall and defining therewith an annular opening concentric with said aperture, a deformable substantially incompressible annular insert received within and filling said annular chamber and having a portion protruding axially beyond said annular opening to engage a surface against which the fastener is urged prior to engagement by any other portion of the fastener, said radial inner wall deformable radially inwardly to circumferentially grip a male fastener extending through the aperture under radial inward compressive loading exerted by the annular insert engaging a surface against which said end of the fastener is urged, the distal end of said radial outer wall having a radial outer surface of convex shape sloping axially and inwardly toward said annular opening to provide a camming surface operable to deform the radial outer wall radially inwardly upon engagement thereof with a surface against which said end of the fastener is urged thereby entrapping said annular insert against radial outward extrusion between the surface against which the fastener is urged and said end of the fastener and increasing the radial inward compression on the insert to more tightly urge the same and said radial inner wall against the male fastener.

2. The invention as defined in claim 1 characterized in that said fastener is internally threaded for threaded engagement with a threaded male fastener.

3. The self-locking nut member defined in claim 1, characterized in that the distal end of said radial outer wall is hooked radially inwardly entrapping the annular insert prior to assembly.

References Cited

UNITED STATES PATENTS

| 985,826 | 3/1911 | McLaughlin | 151—19 |
| 1,820,965 | 9/1931 | D'Halloy | 151—19 |
| 2,576,890 | 11/1951 | Poupitch | 151—21C |
| 3,003,765 | 10/1961 | Lyon | 151—19 |
| 3,265,107 | 8/1966 | Glicksman | 151—7 |

FOREIGN PATENTS

| 214,024 | 4/1958 | Australia | 85—1JP |
| 578,092 | 6/1933 | Germany | 151—19 |
| 582,097 | 9/1958 | Italy | 151—7 |
| 80,650 | 6/1934 | Sweden | 151—7 |

MARION PARSONS, JR., Primary Examiner

U.S. Cl. X.R.

85—1, 50; 151—7, 21